Jan. 19, 1932.    C. R. NICHOLS ET AL    1,841,975
ELECTRICAL PROSPECTING
Original Filed Aug. 20, 1927
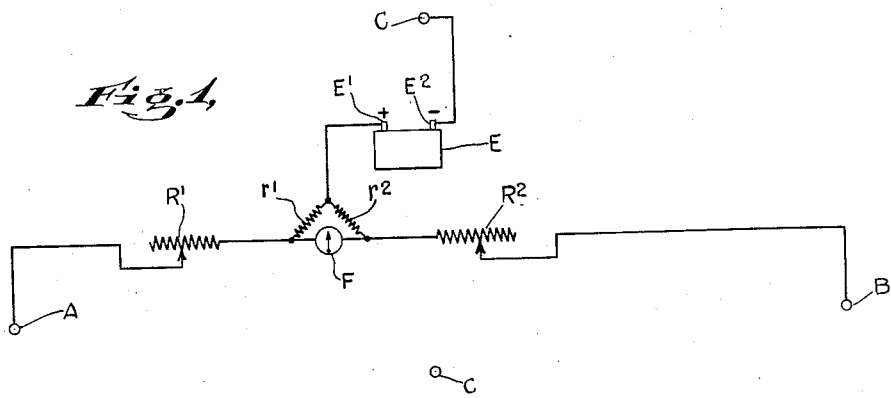
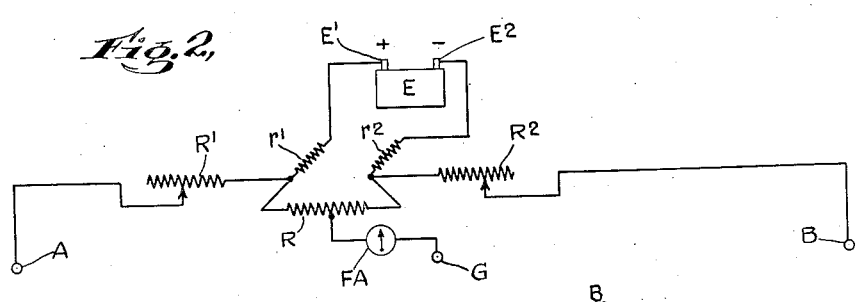
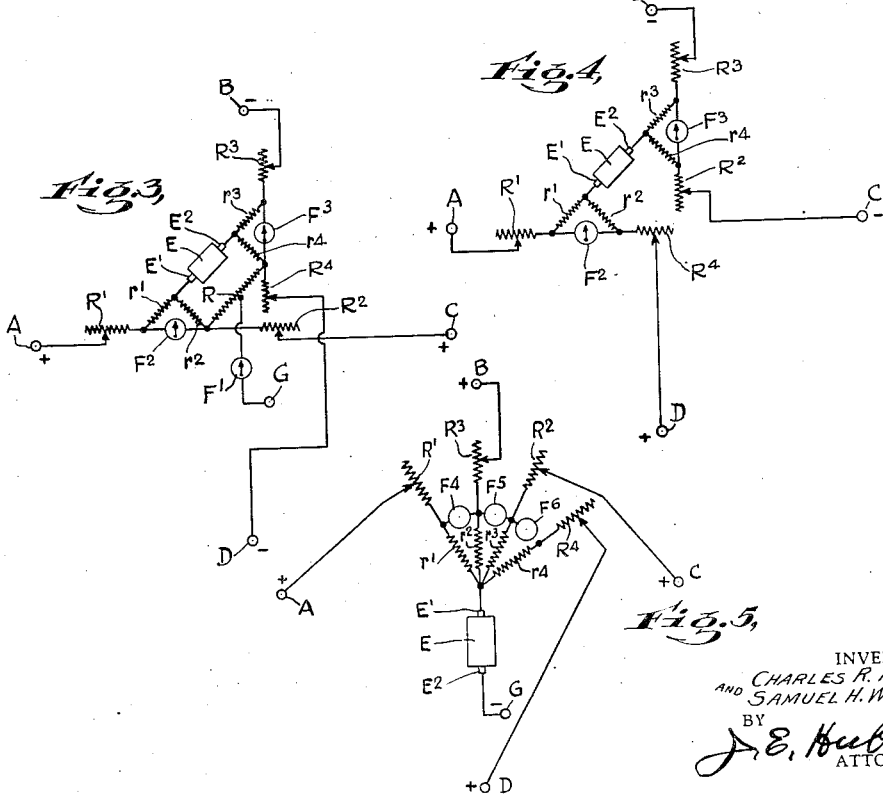
INVENTORS
CHARLES R. NICHOLS
AND SAMUEL H. WILLISTON
BY
J. E. Hubbell
ATTORNEY Patented Jan. 19, 1932

1,841,975

UNITED STATES PATENT OFFICE

CHARLES R. NICHOLS AND SAMUEL H. WILLISTON, OF DALLAS, TEXAS

ELECTRICAL PROSPECTING

Application filed August 20, 1927, Serial No. 214,234. Renewed December 10, 1931.

The general object of the present invention is to provide an improved method of, and apparatus for determining the location and/or character of sub-surface bodies or earth portions differing in electrical resistance from adjacent earth portions.

More specifically, the object of the invention is to provide an improved method of, and means for determining the effects of an electrical energization of separated earth points, on potential or current values at another earth point, conveniently referred to as the exploration point, and located at a distance from the points of energization.

The present invention is characterized by the provisions made for the effective use of the portion of the energizing circuit or circuit system which is external to the earth itself, to establish a definite or base potential at a point in said circuit system which may be utilized in determining the potential at the exploration point, or in making measurements dependent on the difference between said base potential and the exploring electrode potential.

In a preferred practical mode of using the invention, an exploring electrode in contact with the earth at an exploration point is connected to the base potential point in the energizing circuit system by a circuit portion, including a suitable instrument, such as a galvanometer or sensitive ammeter, for measuring potential differences between the electrode and base potential point, or for measuring current flows which result from such differences in potential. For example, the exploring electrode may be moved over the earth's surface until a point or points on the latter are located which have the same potential value as said base potential point. The location of the equipotential point or points so determined, relative to some geometric point or points fixed by the location of the energized points, furnishes evidence of the character and location of disturbing bodies beneath the surface of the exploration field of different resistance from the main earth material beneath said field. In an alternative use of the invention, the exploring electrode is placed at a geometric point definitely located with respect to the energization points, and the character and location of disturbing sub-surface earth portions are determined by the character of the current flow, if any, between the exploring electrode and the base potential point.

The present invention is especially characterized by the manner in which the base potential point in the energizing circuit is established, and in particular by the steps taken to compensate for the variable and ordinarily unknown, contact resistance between the earth and the external energization circuit at each point of energization.

Those skilled in the art will understand that the term "point of energization" as used herein, does not mean a single mathematical point at which the external energization circuit is in contact with the earth, but ordinarily represents a central point about which, or a line along which, a plurality of electrodes connected to the external energizing circuit, are in contact with the earth. It is possible in some special cases to make contact with the earth at each energization point by means of a single contact or electrode, but in such case the single contact electrode employed must be of considerable size to minimize the earth contact resistance, which ordinarily can best be minimized by means of a considerable number of such contacts at each energization point. Whether a single large electrode or a number of small electrodes be employed, the resistance between the earth and the external energizing circuit will ordinarily be different between different portions of the contact metal and the adjacent earth. These differences are due to such causes as moisture, compactness, and other physical, as well as chemical characteristics of the particular portions of the earth in immediate contact with, or closely adjacent the energization contact electrodes.

In accordance with the present invention, adjustable resistances are so disposed and adjusted in the external energization circuit as to eliminate, so far as the location of the base potential point is concerned, any and all effect due to the unknown earth contact resistance. In practice, the adjustable resistances are so located in the separate branches of the energization circuit connected to the different energization points, that the resistances of the different branches may be made equal, or in definite proportion to one another. This means in practice that the sum of the adjustable resistance in each branch of the energizing circuit, and the unknown earth contact resistance at the energized point to which the branch is connected, is made equal to or in definite proportion to the sum of the external resistance in, and the earth contact resistance pertaining to each of the other energizing circuit branches.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described preferred embodiments of the invention.

Of the drawings:—

Figs. 1 and 2 are diagrams illustrating circuit arrangements successively employed in one mode of operation;

Figs. 3 and 4 are diagrams illustrating a second mode of practicing the invention; and Fig. 5 is a diagram illustrating a third mode of procedure.

In Fig. 1, A and B represent electrodes in contact with the earth at separated energization points, and each connected to one terminal E' of a source of current E which may be an alternator, but preferably is a storage battery or other suitable source of direct current. As shown, the second terminal $E^2$ of the current source E is connected to an electrode C in contact with the earth at a substantial distance from each of the electrodes A and B. The connections between the terminal E' and the electrodes A and B include resistances R' and $R^2$, respectively. One of these resistances must be adjustable, and as shown, each is adjustable. Advantageously a resistance $r'$, is interposed between the terminal E' and the resistance R', and a resistance $r^2$ equal to the resistance $r'$ is interposed between the terminal E' and resistance $R^2$. As shown, a galvanometer F connects the terminals of the resistances $r'$ and $r^2$ remote from the terminal E'.

In the contemplated use of the apparatus shown in Fig. 1, the relative values of the resistances R' and $R^2$ in circuit with the electrodes A and B, respectively, are varied until the galvanometer F indicates that there is no potential difference between its terminals. When this occurs, the sum of the unknown contact resistance between the earth and electrode A and the resistance R', will be practically equal to the sum of the resistance $R^2$ plus the unknown contact resistance between the electrode B and the earth, and the current flowing through each of the electrodes A and B will then be alike.

The above mentioned practical resistance equality results from the known fact that the earth resistance between the electrodes A and C and between the electrodes B and C is confined almost entirely to what is herein referred to as contact resistance. The cross section of the conductor formed by the earth is so large that any difference in earth resistance not due to the character of the contact of electrodes A, B and C with the earth and the composition of the earth within a comparatively few feet of the electrodes proper, is negligible.

A sub-surface body along the line AC, for example, differing in conductivity from the general earth conductivity may result in readily measurable effects on the potential difference between separated points of the earth surface adjacent the line AC without having any significant influence in the total earth resistance between the electrodes A and C.

After the total resistances of the two branches of the energization circuit are thus balanced, and without change in adjustment of the resistances R' and $R^2$, the circuit arrangement shown in Fig. 2 is established. In changing from the arrangement shown in Fig. 1 to that shown in Fig. 2, the circuit branch including the resistance $r^2$ is disconnected from the terminal E', and connected to the terminal $E^2$, from which the electrode C is disconnected. In Fig. 2 a high potentiometer resistance R is connected between the terminals of the resistances R' and $R^2$ adjacent the current source E, and an exploring electrode G is connected through an ammeter or galvanometer FA to the resistance R at an intermediate point of the latter so located that the resistances of the portions of the resistance R at each side of said point are in a definite predetermined ratio, which in many cases is advantageously unity.

With the circuit arrangement shown in Fig. 2, and with the resistances of the two energizing circuit branches balanced, as described, the galvanometer or sensitive ammeter FA connected in circuit with the electrode G, will give useful and readily interpreted indications of the earth's structure beneath the exploration field. If the fixed potential point in the potentiometer R to which the exploring electrode G is connected lies between sections of the resistance R of equal value, the instrument FA may be used to locate the mid-potential line on the earth surface between the electrodes A and B, by moving the exploring contact G around on the earth surface until a suitable number of points along said mid-potential line are located. When the electrode G is in contact with the earth along said line the instrument FA will give a zero reading, provided the effect of stray earth currents, if any, is neutralized. Alternatively, if the exploring electrode G is located on the line between the points A and B at a point midway between the latter, or at some other point definitely located geographically with respect to said points A and B, the indications of the instrument FA may afford useful indications of the nature of the mid-potential line displacement from the point at which the exploring electrode G is located.

In the circuit arrangement illustrated in Fig. 3, the energization points A and C are connected to one side of the source of current E through separate circuit portions exactly like those shown in Fig. 1, and the energization points B and D are similarly connected to the opposite side of the source of current. The points B and D are symmetrically disposed with respect to the points A and C, and at opposite sides of the line A—C. The energization circuit branch running to the point B includes a fixed resistance $r^3$ and an adjustable resistance $R^3$, and the branch running to the point D includes a fixed resistance $r^4$ and an adjustable resistance $R^4$. In Fig. 3, the potentiometer resistance R is connected to the energization branch for the point C, between the resistance $r^2$ and adjustable resistance $R^2$, and to the energization branch for the point D at a point between the resistance $R^4$ and the resistance $r^4$ in that branch.

It will be apparent that when the resistances $R'$, $R^2$, $R^3$ and $R^4$ are so relatively adjusted that the total resistance including the unknown earth contact resistance in the separate energization circuit branches are all alike, the mid-point in the potentiometer resistance R will be at the same potential as the mid-potential earth surface point in the exploration field. The last mentioned point will be the intersection point of a mid-potential line passing between A and D and between C and B, and a mid-potential line passing between A and B and between C and D. With the energization points at the corners of a square as shown, or at the corners of a rectangle, the point of intersection of said mid-potential lines will coincide with the geometric center of said square or rectangle, provided the resistance of the earth beneath the exploration field is uniform. If said resistance is not uniform, the mid-potential point of the exploration field will be displaced from said geometric point in a direction and to an extent which can be determined or accurately estimated by means of the exploring contact G connected to the mid-potential point of the potentiometer resistance R, by following the procedure previously described in connection with Figs. 1 and 2.

With the arrangement shown in Fig. 3, a proper relative adjustment of the resistances $R'$ and $R^2$ is insured when the instrument $F^2$ indicates no potential difference as a result of the currents flowing from the generator through the corresponding resistances $r'$ and $r^2$. While the instrument $F^3$ shown in Fig. 3, forms a means for determining when current through the energization branches running to the energization points B and D are equal, the readings of the instruments $F^2$ and $F^3$ in the arrangement shown in Fig. 3 are not sufficient to determine the relative adjustments of the resistances $R'$, $R^2$, $R^3$ and $R^4$ required. Such relative adjustments may be secured, however, by first interchanging the connections between the generator E and the points D and C as indicated in Fig. 4 so as to reverse the polarity of those points, and then, without change in the resistances $R'$ and $R^2$, adjusting the resistances $R^4$ and $R^3$ until the instruments $F^2$ and $F^3$ indicate zero potential differences between their terminals. When this has been done, the resistances in all four energization branches will be the same provided, of course, that in the meantime there has been no change in the resistances of the circuit branches running to the points A and C.

After the resistances in the four separate energization branches are thus balanced, the circuit arrangement of Fig. 3 is again established and by means of the electrode G and instrument $F'$, the mid-potential point of the exploration field may then be located, or the current flow due to the potential difference between the geometric center of the field and the mid-potential point of the potentiometer resistance R may be measured.

An alternative method of balancing the resistances in four energization circuit branches of the kind shown in Fig. 3, is illustrated in Fig. 5. In Fig. 5 the four separate branches of the energization circuit are all connected to one terminal $E'$ of the source of current E, and the other terminal E of the source of current is grounded, as by means of the exploring contact G. As shown in Fig. 5 a galvanometer $F^4$ is connected between the circuit energization branches for the points A and B. Another galvanometer $F^5$ is connected between the energization branches for the points B and C, and a third galvanometer $F^6$ is connected between the energization branches for the points C and D, the connection to each branch being made at a point between the fixed resistance $r'$ or $r^2$, etc., and the corresponding adjustable resistances $R'$ or $R^2$, etc. in the branch. As will be readily apparent, when the resistances $R'$, $R^2$, $R^3$ and $R^4$ are so adjusted that the terminals of each of the different galvanometers $F^4$, $F^5$, $F^6$ are at the same potential, the total resistance in each of the different energization branches will be the same. The circuit connections shown in Fig. 5 are then shifted to establish the circuit arrangement illustrated in Fig. 3.

In practice each of the detecting circuits including the exploring electrode G illustrated in the different figures, may well include amplifying provisions and provisions for eliminating the effect of stray earth currents such as are disclosed and claimed in our prior application Serial No. 129,430, filed August 16, 1926, and in practice, also, the energization currents supplied by the source E may advantageously be interrupted and reversed at regular intervals as described in our said prior application. The features just mentioned of the invention disclosed in our prior application need not be described in detail herein, however, as they form no part of the present invention, although they may advantageously, in some cases, at least, be used in practicing the present invention.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. In the method of electrical prospecting which comprises the energization of spaced apart electrodes in contact with the earth, through separate energizing circuit branches connected to the different electrodes, the improvement which consists in giving said branches such relative resistance values as to compensate for the differences in the earth contact resistances of the corresponding electrodes.

2. In the method of electrical prospecting, the steps which consist in connecting a plurality of spaced apart earth portions to separate energizing circuit branches, and adjusting the relative resistances of said branches so that the same current flow will be produced in each when the same potential, different from the normal earth potential, is impressed on each branch.

3. In the method of electrical prospecting the steps which consist in connecting a plurality of spaced apart earth portions to a common source of potential through separate circuit branches including electrodes in contact with said earth portions, adjusting the relative resistances of said branches to obtain equal current flows in the different branches, and then connecting a source of potential difference between said branches, and observing an effect produced by the resultant current flow through the earth.

4. In the method of electrical prospecting the steps which consist in connecting a plurality of spaced apart earth portions to a common source of potential through separate circuit branches including electrodes in contact with said earth portions, adjusting the relative resistances of said branches to obtain equal current flows in the different branches and then connecting a source of potential difference between said branches and establishing a base potential point at which the potential is intermediate that of the terminals of said source.

5. In the method of electrical prospecting the steps which consist in adjusting the relative resistances of separate energizing circuit branches connected to spaced apart earth portions so that the same current flow will be produced in each branch when the same potential, different from that of the earth, is impressed on each branch, and then after so balancing the resistances of said circuit branches, impressing a potential difference on said earth portions by connecting the latter through said branches to a source of potential difference, and observing an effect produced by the resultant current flow through the earth.

6. Apparatus for electrical prospecting comprising electrodes in contact with the earth at separate energization points, an energizing circuit including separate branches connected to the electrodes at the different energization points, resistances in said branches adjustable to make the sum of such resistance and the earth contact resistance of the corresponding electrode bear a definite relation to the corresponding resistance sum for each of the other branches, and an earth engaging electrode connected to said circuit at a base potential point in said circuit between which point and the earth at each of said energization points definitely related potential differences exist.

7. Apparatus for electrical prospecting comprising electrodes in contact with separated portions of the earth, a source of current, conductors connecting the opposing terminals of said source to different electrodes, a potentiometer resistance connecting the opposing terminals of said source, adjustable resistances for equalizing the resistances of the different circuit branches each formed by a different electrode and the corresponding conductor connecting it to the source of current so as to compensate for varying earth contact resistances of the different electrodes and an earth contact connected to an intermediate point in said potentiometer resistance.

8. In the method of electrical prospecting which comprises the connection of two separated portions of the earth's surface to an external energizing circuit and thereby creating a potential difference between said portions, the improvement which consists in adjusting resistances in said external circuit to thereby create predetermined relative potential differences between said portions and a common point in said energizing circuit and comparing the potential at said point with the potential of a third portion of the earth's surface.

Signed at Dallas, in the county of Dallas, and State of Texas, this sixteenth day of August, A. D., 1927.

CHARLES R. NICHOLS.
SAMUEL H. WILLISTON.